Sept. 29, 1964  R. G. ELLIS  3,150,765
CHUCK ASSEMBLY
Filed March 15, 1963  2 Sheets-Sheet 1
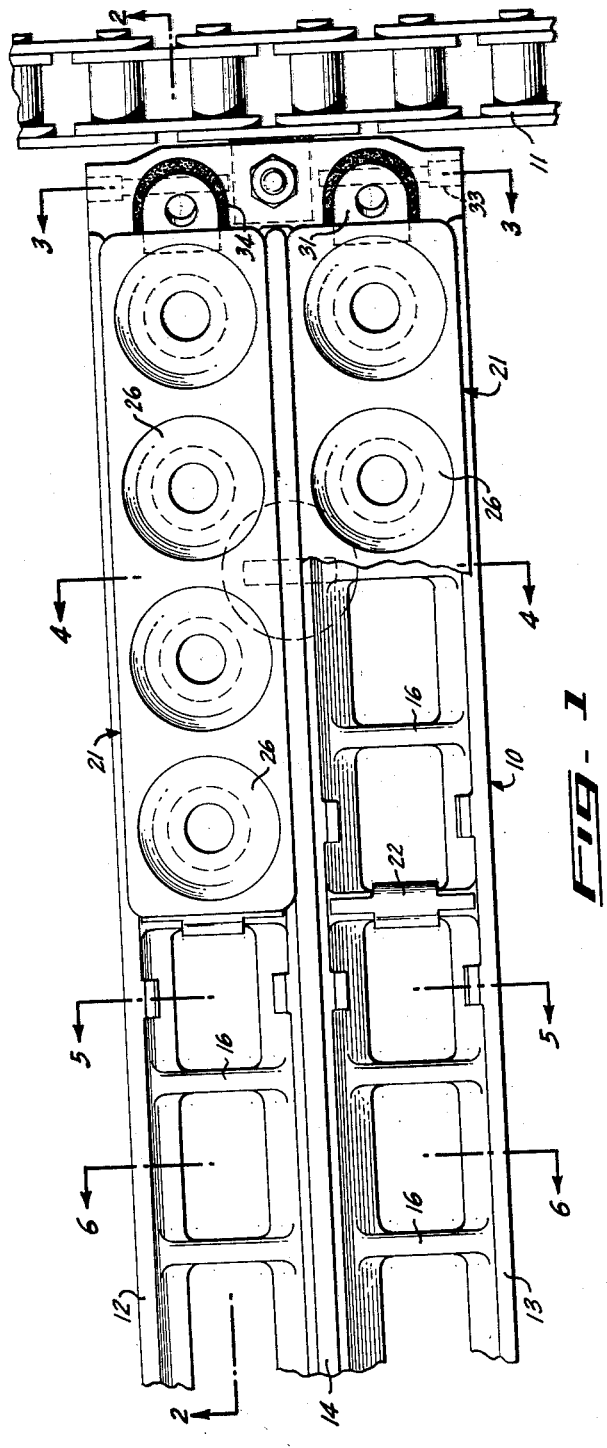
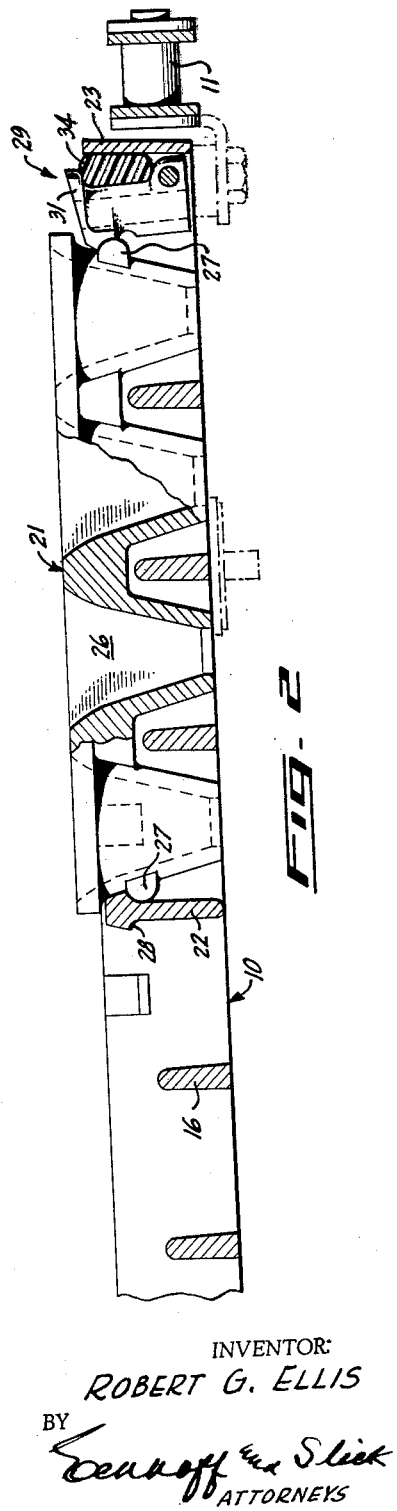
INVENTOR:
ROBERT G. ELLIS
BY
Sennoff & Slick
ATTORNEYS Sept. 29, 1964     R. G. ELLIS     3,150,765
CHUCK ASSEMBLY
Filed March 15, 1963     2 Sheets-Sheet 2
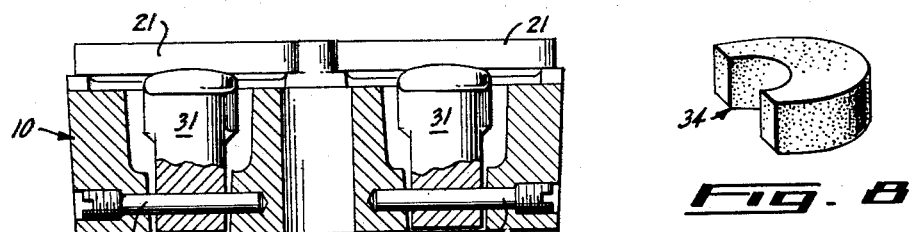
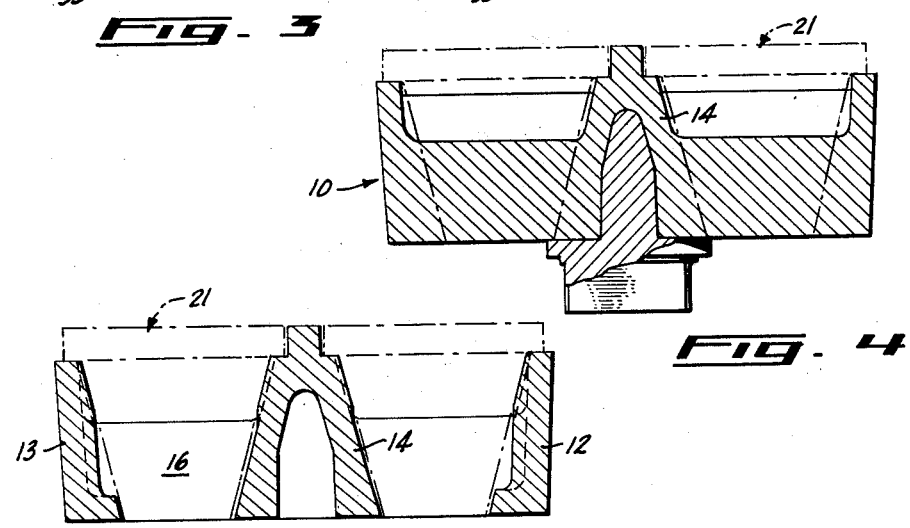
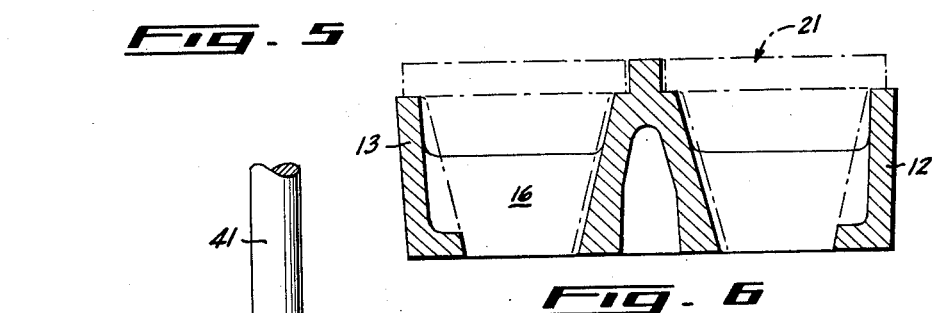
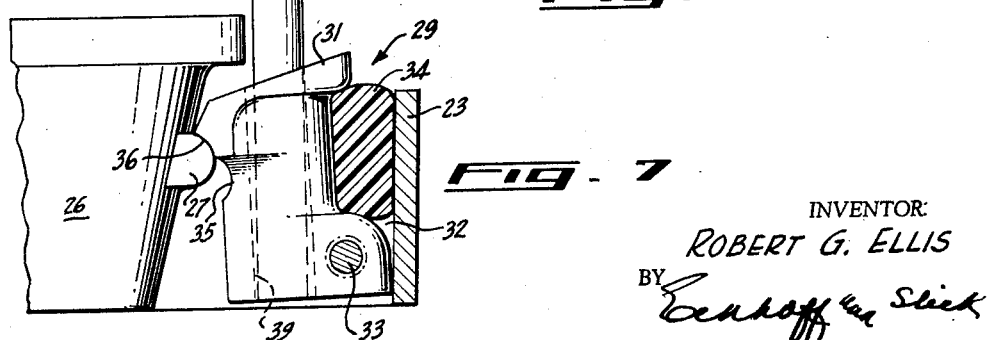
INVENTOR:
ROBERT G. ELLIS
BY
ATTORNEYS _United States Patent Office_

3,150,765
Patented Sept. 29, 1964

3,150,765
CHUCK ASSEMBLY
Robert G. Ellis, Richmond, Calif., assignor to Atlas
 Pacific Engineering Company, a corporation of
 California
Filed Mar. 15, 1963, Ser. No. 265,561
4 Claims. (Cl. 198—131)

This invention relates in general to a readily detachable chuck assembly having a plurality of receptacles for fruit such as olives which may be readily detached from its supporting conveyor and replaced.

Machines incorporating an endless chain conveyor having a plurality of chucks for holding fruit require that the chucks be replaced when a different size of fruit is to be processed. When the cups are individually attached as in the co-pending application Serial No. 208,172 filed June 15, 1962, replacement of one size of cup with another is time consuming because of the large number of cups which are involved in the change.

It is an object of this invention to provide a chuck assembly which can be readily removed and replaced on a conveyor.

It is a further object of this invention to provide a structure enabling a plurality of fruit-holding cups to be changed by a simple operation so that one can in a very short period of time replace all of the cups mounted on the machine with cups of another size.

Still another object of this invention is to provide a structure wherein a plurality of fruit-holding cups are provided in a chuck assembly which can be removed from the machine with a single manual action requiring only the use of a lever as a tool.

Generally, this invention comprises a modification of a machine for processing fruit where a conveyor continuously advances a series of fruit-holding cups past a station at which an operation such as pitting is performed on the fruit. In the improvement of this invention, there is provided a rack secured transversely of two spaced conveyor chains with at least a single chuck assembly mounted on each of the racks. Each chuck assembly incorporates a plurality of cups or receptacles for the fruit to be pitted. Each assembly is releasably held in the rack by interlocking elements between the rack and chuck assembly. At least one of the locking elements is mounted in such a manner that, when moved in one direction, the element will engage a mating element and so secure the chuck assembly. The movably mounted element also has means thereon to permit the element to be grasped and moved so as to release the chuck assembly. This same element is normally urged by a resilient element in a direction to engage the mating element on the other member whereby the chuck is locked in place on the rack.

In the drawings:

FIGURE 1 is a plan view showing one side of a rack with one chuck assembly in place and another partially broken away.

FIGURE 2 is a section taken generally along the line 2—2 of FIGURE 1.

FIGURES 3, 4, 5 and 6 are sections taken generally along the respective section lines 3—3, 4—4, 5—5 and 6—6 in FIGURE 1.

FIGURE 7 is an enlarged view showing the means used for securing a chuck assembly in place.

FIGURE 8 is a perspective view of a resilient element utilized in the locking means shown in FIGURE 7.

As is well known in the art, a continuous conveyor is provided having a plurality of chuck assemblies for carrying a fruit past a pitting station at which the fruit is pitted. This conveyor is made up of opposite conveyor chains with the chuck assemblies extended between them. In FIGURE 1 in the drawings, I have shown, for convenience, one end of the rack generally indicated at 10 and mounted upon and secured to a conveyor chain 11. Each rack 10 is made up as an integral structure usually by casting of aluminum or like metal. Each rack includes longitudinal side walls 12 and 13 and an intermediate wall 14 which is V-shaped in cross section as appears in FIGURE 5. The several walls are joined by a series of spaced intermediate transverse walls 16 to provide a strong, rigid support.

In the form of rack as shown in the drawings, provision is made for the insertion of separate chuck assemblies generally indicated at 21 and removably mounted between an intermediate wall 22 and an outer end wall 23. Each chuck assembly includes a plurality of fruit receiving receptacles 26 of a size and shape suited to the fruit handled. To secure the chuck assembly removably in place on the rack, an extending ear 27 is provided at each end of the assembly. The intermediate wall 22 has a recess 28 on each side adapted to receive an ear 27 and retain it in place.

The ear 27 at the other end of an assembly is engaged by a locking mechanism generally indicated at 29. Each locking mechanism includes a lever 31 mounted in a recess 32 on end wall 23 on a pin 33. A U-shaped resilient backing element 34 of an elastomeric material such as rubber (FIGURE 8) is provided in the recess 32 between the lever 31 and the end wall 23, the U-shaped backing element fitting about the lever 31. Each lever includes a recess 36 adapted to receive the adjacent ear 27 on a chuck assembly 21. Each lever 31 is further recessed as at 35 to insure that the engagement between the lever 31 and the ear 27 is by means of the recess 36 engaging the ear 27. Each lever 31 includes a cylindrical bore 39 adapted to receive a rod 41 as is shown in FIGURE 7.

The chucks can be readily removed and replaced. Thus, for example, upon rocking of the rod 41 clockwise in FIGURE 7, the engagement between the lever 31 and the ear 27 will be released and one can readily remove the chuck assembly and insert another which, upon release of the rod 41 and rocking of the lever 31 in a counter-clockwise direction, will lock the chuck assembly in place between the intermediate wall and the end wall.

While the invention has been described as applied to a chuck assembly it is not limited to this application alone for the novel structure employed can be successfully applied to the securing and ready attachment of units other than chuck assemblies.

I claim:

1. In a machine for processing fruit and the like wherein a conveyor carrying a plurality of means for holding said fruit is advanced to a station at which an operation is performed on said fruit, the improvements relating to said means for holding said fruit comprising:
    (a) a rack secured to said conveyor;
    (b) a chuck assembly having a plurality of receptacles to hold said fruit;
    (c) and a means for releasably holding said chuck assembly in said rack, said means comprising interlocking elements on said rack and said chuck assembly at least one of said elements being movably mounted in such a manner that, when moved in one direction, said element will engage a mating element on the member with which it is to interlock, said movably mounted element having means thereon to permit said element to be grasped and manually moved, said movably mounted element being resiliently mounted and normally urged in a direction to engage the said mating element whereby to lock said chuck assembly in place.

2. In a machine for processing fruit and the like wherein a conveyor carrying a plurality of means for holding said fruit is advanced to a station at which an operation is performed on said fruit, the improvements relating to said means for holding said fruit comprising:

(a) a rack secured to said conveyor for movement therewith;

(b) a plurality of chuck assemblies to hold said fruit, each of said chuck assemblies having a plurality of receptacles therein, each of said chuck assemblies being supported by the said rack;

(c) and a means for releasably holding each of said chuck assemblies in the said rack, said means comprising fixed interlocking members on the said rack and on the said chuck assemblies for holding one end of each of the said chuck assemblies in place and a second fixed member integral with each of the said chuck assemblies, said second fixed member being adapted to mate with a movable locking member carried by the said rack, each of the said movable locking members including a movable element secured at an end of the said rack, said movable element normally being urged into engagement with the said fixed member on the said chuck assemblies by a resilient material supported by said rack, said movable mounted elements on the said rack each having means thereon for a lever to permit the said movable mounted elements to be forced into a disengaging position relative to a chuck assembly to permit said chuck assembly to be removed therefrom and replaced.

3. In a machine for processing fruit and the like wherein a conveyor carrying a plurality of means for holding said fruit is advanced to a station at which an operation is performed on said fruit, the improvements relating to said means for holding said fruit comprising:

(a) a rack secured to said conveyor, said rack having opposed longitudinal sides and opposed ends integral therewith, at least one of said ends having a recess therein for holding an elastomeric material;

(b) locking means for releasably holding a chuck assembly in the said rack, said locking means comprising a movable member at one end of the said rack and normally urged in a predetermined direction by the said elastomeric material to engage one end of a chuck assembly, said locking member being movably attached to the said rack and having means thereon permitting the said locking member to be grasped and urged against the resistance of the said elastomeric material, said locking means also incorporating means on said rack for engaging the other end of a chuck assembly;

(c) and at least one chuck assembly fitting between said longitudinal side walls and having a plurality of receptacles therein to hold the said fruit, the said chuck assembly having means thereon for engaging the said locking means of the said rack.

4. In combination, (a) a generally rectangular element providing a work unit and having opposite ends;

(b) a rack having opposite side walls and opposite ends forming a generally rectangular receptacle for receiving the element of paragraph (a);

(c) and means for detachably securing the element in place in the rack comprising;

(d) a cooperating first notch and a first ear provided on the rack and on the element at one end thereof for inter-engagement to secure one end of the element detachably to one end of the rack;

(e) a second ear on the other end of the element;

(f) a member movably mounted at the other end of the rack and having a notch for receiving in locking engagement the second ear;

(g) and means biasing the member of paragraph (d) into locking engagement with the second ear.

References Cited in the file of this patent
UNITED STATES PATENTS

| | | |
|---|---|---|
| 2,522,912 | Weiss | Sept. 19, 1950 |
| 3,090,478 | Stanley | May 21, 1963 |